United States Patent
Tamada et al.

(10) Patent No.: US 7,369,289 B2
(45) Date of Patent: May 6, 2008

(54) OPTICAL MODULATION DEVICE AND IMAGE DISPLAY APPARATUS USING THE SAME

(75) Inventors: Hitoshi Tamada, Kanagawa (JP); Ayumu Taguchi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/864,535

(22) Filed: Jun. 10, 2004

(65) Prior Publication Data

US 2005/0007643 A1 Jan. 13, 2005

(30) Foreign Application Priority Data

Jun. 20, 2003 (JP) .................... P2003-177283

(51) Int. Cl.
G02B 26/00 (2006.01)
G02F 1/00 (2006.01)
G02F 1/01 (2006.01)
G02F 1/03 (2006.01)
G02F 1/153 (2006.01)
G02F 1/07 (2006.01)

(52) U.S. Cl. .................... 359/238; 359/237; 359/247; 359/267; 359/290; 359/291

(58) Field of Classification Search ............ 359/238, 359/237, 242, 247, 251, 259, 267, 290, 291
See application file for complete search history.

(56) References Cited

U.S. PATENT DOCUMENTS

| 3,164,824 | A |  | 1/1965 | Fredericks et al. |
|---|---|---|---|---|
| 5,555,041 | A | * | 9/1996 | Manabe ....................... 353/98 |
| 5,841,579 | A |  | 11/1998 | Bloom et al. |
| 5,978,056 | A | * | 11/1999 | Shintani et al. ............ 349/137 |
| 5,982,553 | A |  | 11/1999 | Bloom et al. |
| 6,219,015 | B1 | * | 4/2001 | Bloom et al. ................ 345/87 |
| 6,233,339 | B1 | * | 5/2001 | Kawano et al. .............. 380/44 |
| 6,627,365 | B1 | * | 9/2003 | Shiraishi ..................... 430/30 |
| 2005/0018272 | A1 | * | 1/2005 | Kimura ....................... 359/295 |

* cited by examiner

*Primary Examiner*—David Spector
*Assistant Examiner*—Brandi N Thomas
(74) *Attorney, Agent, or Firm*—Reader Fishman & Grauer PLLC; Ronald P. Kananen

(57) ABSTRACT

An optical modulation device is disclosed which can suppress production of a cause of degradation such as a void or hillock on a light illumination surface thereof and can be incorporated in an image display apparatus of a small size and a high luminance to improve the reliability of the same. The optical modulation device includes first and second surface elements movable relative to each other to form different diffraction gratings to modulate light inputted thereto. Each of the first and second surface elements has a light illumination surface made of an AlCu alloy material. The optical modulation device has an airtight sealed space in which surrounding gas for the first and second surface elements is encapsulated. The surrounding gas contains hydrogen gas or helium gas or both of hydrogen gas and helium gas.

16 Claims, 17 Drawing Sheets

VIEW ILLUSTRATING TEMPERATURE CHARACTERISTIC WHERE $H_2(10\%)-He(10\%)-N_2(80\%)$ GAS IS USED

F I G. 1 9
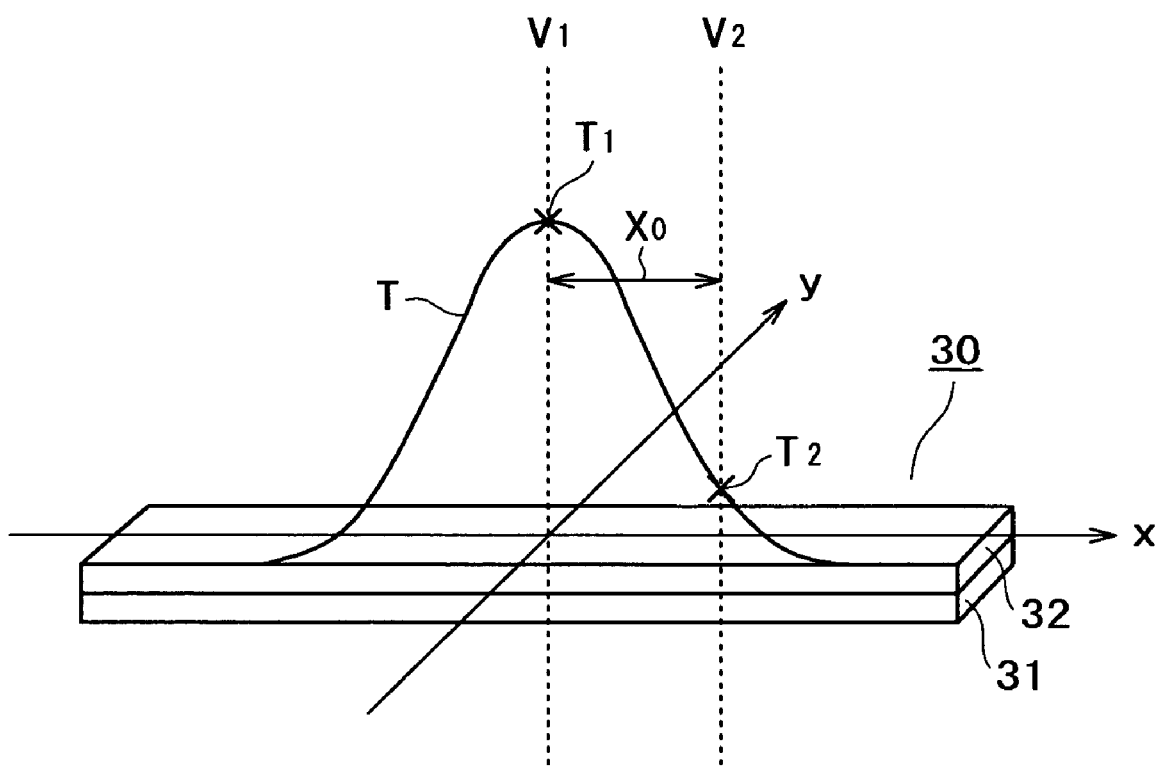

OPTICAL MODULATION DEVICE AND IMAGE DISPLAY APPARATUS USING THE SAME

BACKGROUND OF THE INVENTION

This invention relates to an optical modulation device for modulating light emitted from a light source in various optical apparatus such as an image projection apparatus and a printer and an image display apparatus which uses an optical modulation device.

As a method of raising the resolution of an image in various image display apparatus such as a projector and a printer, a method wherein a flux of light from a one-dimensional image displaying optical modulation device is scanned by a light scanning mechanism and projected on an image forming mechanism to form a two-dimensional image is known and disclosed, for example, in U.S. Pat. No. 5,982,553.

As one of such one-dimensional optical modulation devices, a GLV (Grating Light Valve) developed by Silicon Light Machines (SLM), a company of United States, is known and disclosed, for example, in U.S. Pat. Nos. 3,164,824 or 5,841,579.

The GLV employs a diffraction grating of the phase reflection type which makes use diffraction of light. As an example of the GLV, a GLV of a ribbon element type configuration has been proposed and is shown in FIG. 18. Referring to FIG. 18, the GLV of the type mentioned includes, for example, three first surface elements 30*a* and three second surface elements 30*b* disposed alternately. Each of the first surface elements 30*a* is formed from a movable ribbon while each of the second surface elements 30*b* is formed from a fixed ribbon.

In the GLV having the configuration described above, if a suitable voltage is applied between a common electrode 33 on the substrate (not shown) side and the first surface elements 30*a*, then the first surface elements 30*a* are deformed to move by a suitable amount toward the substrate side thereby to form a diffraction grating to incoming light.

Since the first and second surface elements in the GLV have a width of, for example, approximately 25 μm and a length of, for example, approximately 200 μm and hence are very small in size, the GLV has an advantage that a high speed switching movement of the first surface elements, that is, of the movable ribbons, is possible. Further, since display of a broadband width can be realized, that is, since a high degree of modulation of the variation of the light amount can be realized, by changing the reflection factor of diffracted light in accordance with the distance of movement of the movable ribbons, a small-sized image display apparatus having a high resolution and a low operation voltage can be provided using the GLV.

In a one-dimensional optical modulation device such as a GLV as described above, when compared with a two-dimensional optical modulation device such as a DMD (Digital Micromirror Device: Texas Instruments) which uses a liquid crystal panel or a micromirror unit, the illumination light density necessary to obtain an equal luminance is, for example, in display of 1,080×1,902 pixels, as high as approximately 1,920 times. More particularly, in order to achieve a high luminance of 10,000 [lm] (lumen) as in an application as a projector for a theater, the laser illumination power to an optical modulation device which uses the GLV or the like is very high and approximately 50 to 100 W, and if this is condensed into a linear beam of approximately 25 μm wide (a spot diameter of $1/e^2$ of the light intensity) on the surface of a ribbon of the GLV, then a void or hillock is produced on the GLV ribbon and degrades the GLV ribbon, resulting in a problem that the dark level is deteriorated and, in the worst case, the GLV is electrically broken and does not function any more.

SUMMARY OF THE INVENTION

It is an object of the present invention to provide an optical modulation device which can suppress production of a cause of degradation such as a void or hillock on a surface thereof.

It is another object of the present invention to provide an image display apparatus of a small size and a high luminance which is improved in reliability.

In order to attain the objects of the present invention, there is provided an optical modulation device, including first and second surface elements movable relative to each other to form different diffraction gratings to modulate light inputted thereto, each of the first and second surface elements having a light illumination surface made of an AlCu alloy material, the optical modulation device having an airtight sealed space in which surrounding gas for the first and second surface elements is encapsulated, the surrounding gas containing hydrogen gas or helium gas or both of hydrogen gas and helium gas.

In the optical modulation device, the light illumination surface of each of the first and second surface elements which form diffraction gratings of the optical modulation device is made of an AlCu alloy material and gas containing hydrogen gas or helium gas or both of hydrogen gas and helium gas is used as the surrounding gas particularly for the first and second surface elements of the optical modulation device encapsulated airtight. Consequently, a temperature gradient at the surface of the optical modulation device, that is, at the first and second surface elements caused by a temperature rise of the optical modulation device by illumination of light such as a laser beam can be suppressed efficiently. Consequently, appearance of a void, a hillock or the like can be suppressed, and accordingly, improvement in durability and reliability can be anticipated.

Particularly where a brazed GLV device wherein the first and second surface elements which form diffraction gratings are inclined by a predetermined angle with respect to a reference plane is used as the optical modulation device and the distance between the first and second surface elements is set to 0.4 μm or less, the diffraction efficiency can be improved. Consequently, where an equal luminance is required, the output power of light such as a laser beam to be illuminated on the optical modulation device can be reduced. In other words, even if the illumination output power of the laser beam is suppressed comparatively low, display of a comparatively high luminance can be achieved. As a result, degradation of the surfaces of the first and second surface elements can be suppressed thereby to achieve improvement in the durability similarly.

Where, for example, a GLV device described above is used as the optical modulation device and Al alloy is used as the material of the first and second surface elements which form diffraction gratings of the optical modulation device, that is, the material of the surface reflecting layer of belt-like ribbon elements, the mechanism of degradation by illumination of a laser beam can be discussed in connection with a mechanism of occurrence of electromigration in LSI wiring techniques. This is described below.

FIG. 19 schematically shows a temperature profile T in the x direction (hereinafter referred to as ribbon lengthwise direction) where the lengthwise direction of each of ribbon elements 30 which form the first and second surface elements is taken as the x axis and the widthwise direction of each ribbon element is taken as a y axis. If it is assumed that a base 31 of the ribbon element 30 is made of SiN and a reflection layer 32 of the ribbon element 30 is made of Al, then a stressmigration V representative of a mass movement by deformation from a maximum temperature position (temperature T1) to a position (temperature T2) spaced by a distance x0 indicated by broken lines v1 and v2, respectively, can be determined in accordance with the following expression (1) (refer to, for example, "Journal Applied Physics, 74(2), 15 Jul. 1993"):

$$V=D/(k \times T) \times \Delta \sigma \times \Omega a/xo \quad (1)$$

where D is the diffusion coefficient, k the Boltzmann's constant ($1.66 \times 10^{-29}$ m$^3$), T the absolute temperature, $\Delta \sigma$ the distortion, $\Omega a$ the atomic volume, and xo the length.

The distortion $\Delta \sigma$ can be determined in accordance with the following expression (2):

$$\Delta \sigma = E(1-v) \times \int_{T2}^{T1} (\alpha Al - \alpha SiN) dT \quad (2)$$

where E is the Young's modulus, v the Poisson ratio, $\alpha Al$ the coefficient of thermal expansion of Al, and $\alpha SiN$ the coefficient of thermal expansion of SiN.

As can be seen from the expressions above, in order to suppress the degradation, the following two points are particularly significant, that is, to suppress the temperature rise of the ribbon elements by illumination of a laser beam as low as possible and to minimize the temperature gradient in the ribbon lengthwise direction (that is, the longitudinal direction of elongated members which form a diffraction grating) caused by illumination of a laser beam.

As described above, in the present invention, the first and second surface elements which provide the light illumination surface of the optical modulation device are made of an AlCu alloy material with which a temperature gradient is less likely to appear, and gas which contains hydrogen gas or helium gas which has a higher thermal conductivity than inert gas such as nitrogen gas which is usually used as surrounding gas or gas which contains both of hydrogen gas and helium gas is used as the surrounding gas for the first and second surface elements. Consequently, the temperature rise in the illuminated region can be suppressed lower than ever, and the degradation of the surface of the optical modulation device by appearance of a void, a hillock or the like can be suppressed.

Where the optical modulation device whose degradation in characteristic is reduced in this manner is applied to various image display apparatus for high luminance display such as a projector for a theater, since degradation of the optical modulation device is reduced, the image display apparatus are superior in reliability and can be formed in a reduced size and with a high resolution.

Thus, according to another aspect of the present invention, there is provided an image display apparatus, including an optical modulation device, and a screen on which light modulated by the optical modulation device is projected to form an image, the optical modulation device including first and second surface elements movable relative to each other to form different diffraction gratings to modulate light inputted thereto, each of the first and second surface elements having a light illumination surface made of an AlCu alloy material, the optical modulation device having an airtight sealed space in which surrounding gas for the first and second surface elements is encapsulated, the surrounding gas containing hydrogen gas or helium gas or both of hydrogen gas and helium gas.

In the image display apparatus, the temperature rise at the surface of the optical modulation device can be suppressed and the temperature gradient can be moderated. Consequently, degradation of the optical modulation device can be suppressed and appearance of a void or a hillock can be suppressed with certainty, and as a result, display of an image can be achieved stably for a long period of time.

Where the optical modulation device is disposed at a position displaced from the beam waist position of the condenser lens, the spot diameter on the surface of the ribbons of the optical modulation device can be increased when compared with that of a conventional optical modulation device. Therefore, the temperature rise at the surface of the ribbons can be suppressed and the temperature gradient can be moderated. Consequently, the image display apparatus is superior in property that it can provide stable display of an image of a comparatively high luminance for a long period of time.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 19 is a schematic view illustrating stress migration.

DESCRIPTION OF THE PREFERRED EMBODIMENTS

Figure 18:
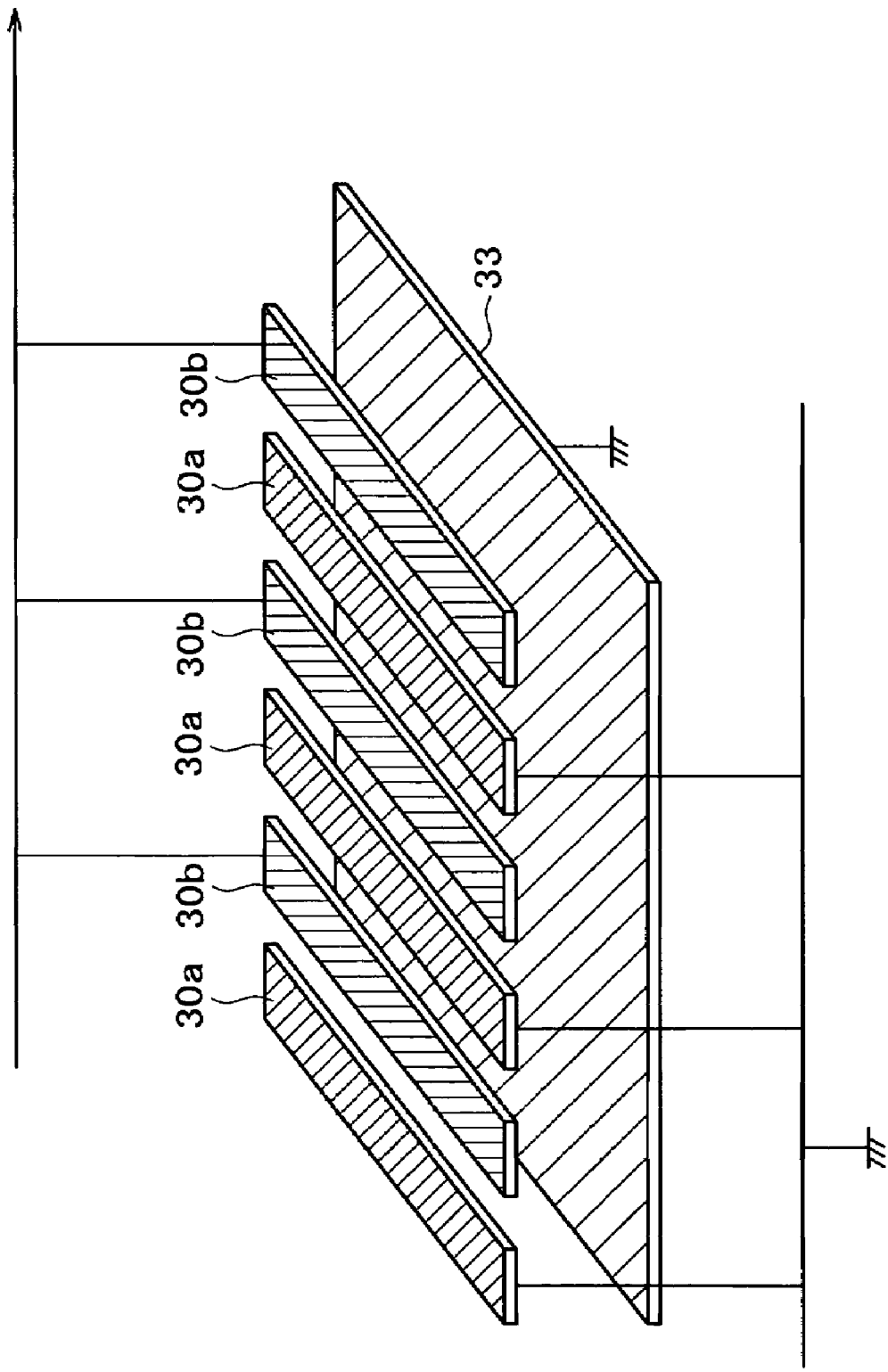
FIG. 18 is a schematic perspective view showing a typical example of an optical modulation device.

First, optical modulation devices to which the present invention is applied are described. In the optical modulation devices, the material of light illumination surfaces of first and second surface elements which form a diffraction grating and surrounding gas for the first and second surface elements are selected suitably. All of the optical modulation devices are configured by applying the present invention to an optical modulation device of the GLV type configuration described hereinabove with reference to FIG. 18. However, the present invention is not limited to them but can be applied also to other various types of optical modulation devices.

[1] First Embodiment

In the present invention, an AlCu alloy material was used as a material of the first and second surface elements of an optical modulation device of the diffraction grating type, that is, as a material of the light illumination surfaces, to raise the light illumination resisting property thereof against a laser beam and so forth. As a result, degradation of the light illumination surface elements by production of a void or the like was suppressed successfully.

First, a deterioration state after illumination of a laser beam where two different alloy materials wherein Si was added individually by 0.5 wt % (weight percent) and by 0.1 wt % to Al were used as a material of the light illumination surface elements of an optical modulation device was examined. In both examples, gas prepared by mixing nitrogen ($N_2$) gas by 80%, hydrogen ($H_2$) gas by 10% and helium (He) gas by 10% was used as the surrounding gas. Results of the deterioration state in the two examples are illustrated in FIGS. 1 and 2.

All of the examples indicate a result of observation through a microscope of the variation of the surface of the optical modulation device where the output power of a green laser of a wavelength of 532 nm was set to 200 mW and the position of the condenser lens was adjusted to change the spot size while the laser beam was illuminated for one hour on the light illumination surface of the optical modulation device. In both of FIGS. 1 and 2, appearance of a void on the light illumination surface is represented by x; appearance of a change in color by Δ; and appearance of no change by ○, and the spot sizes are indicated with respect to the temperature calculated by a finite element method. The boundary between the appearance of no change (○) and the appearance of a change in color (Δ) are represented by solid lines E and F in FIGS. 1 and 2, respectively, and in FIG. 2, a broken line E' is shown at the same position as that of the solid line E in FIG. 1. It is to be noted that solid lines e1 to e4 and f1 to f4 indicate the results of observation where the transmission factor of the ND filter was set to 100%, 50%, 40% and 30%, respectively.

However, if the output of the laser is set to 200 mW and one GLV element is assigned to one pixel and then illumination for 1,080 pixels of an optical modulation device is performed in the conditions, then a power of approximately 100 W is required for the overall optical modulation device, and for example, if red, green and blue colors are synthesized, then although depending upon the efficiency of the optical system, high luminance display of approximately 10,000 [lm] can be obtained on the screen.

Figure 1:
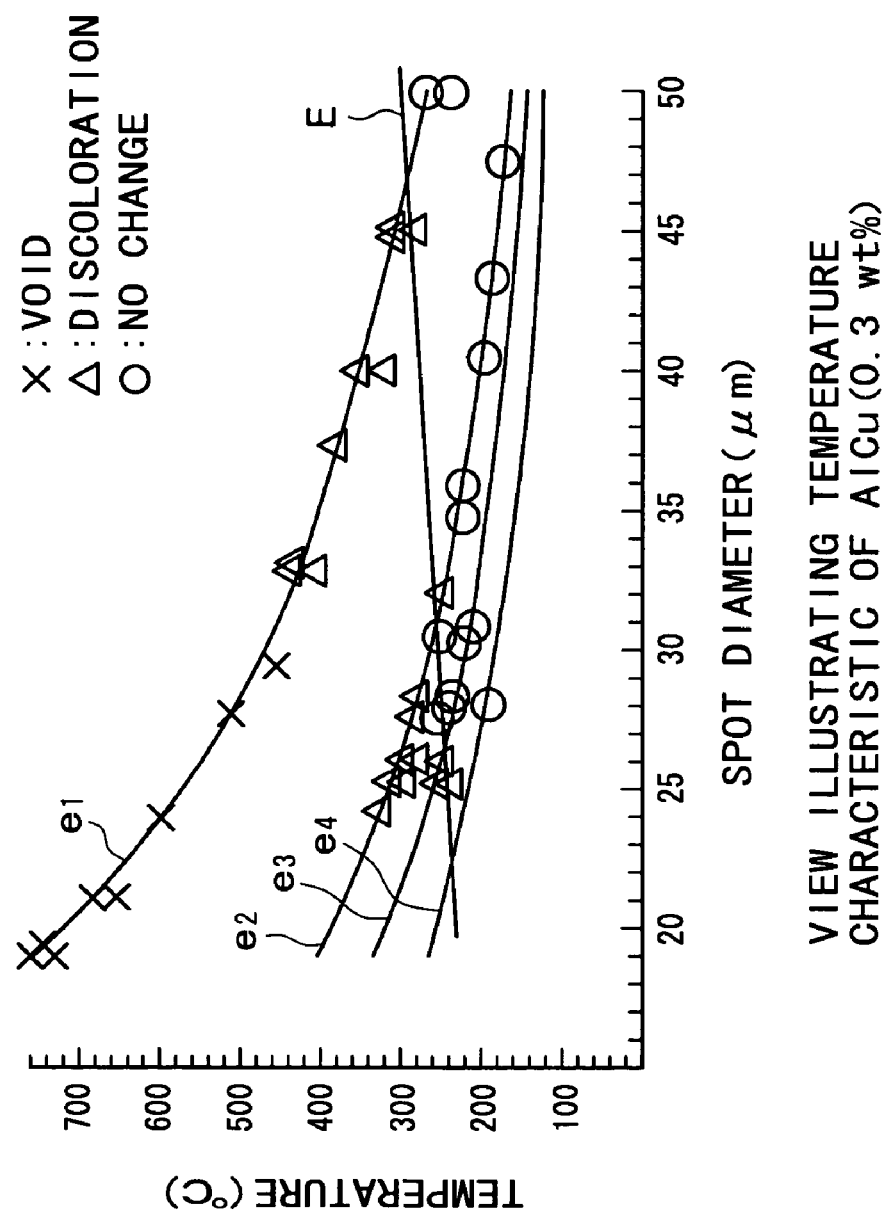
FIG. 1 is a diagram illustrating a temperature characteristic with respect to the diameter of a light spot where first and second surface elements of an optical modulation device are made of an AlCu alloy material.
Figure 2:
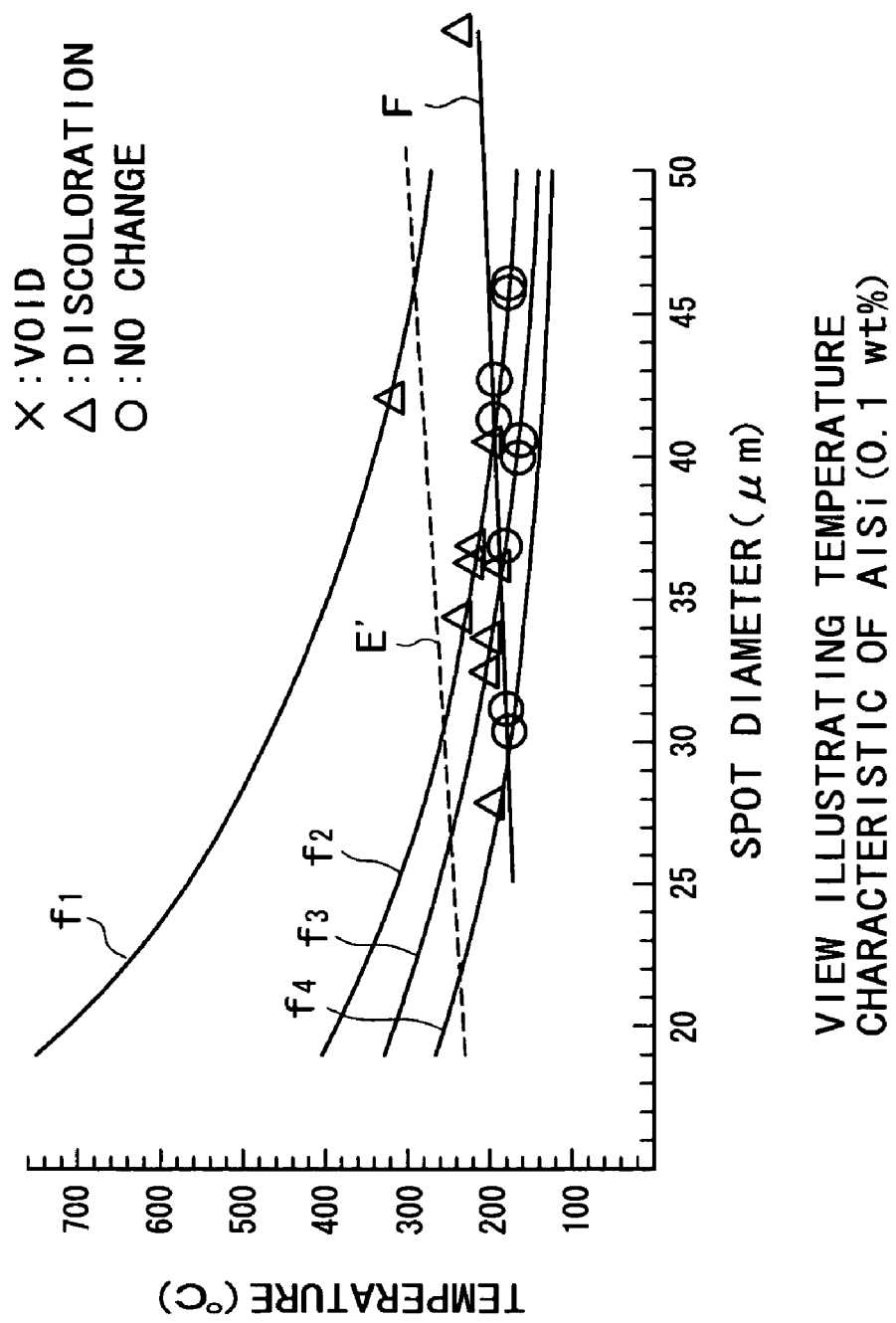
FIG. 2 is a diagram illustrating a temperature characteristic with respect to the spot diameter where the first and second surface elements of an optical modulation device are made of AlSi.

From the results of FIGS. 1 and 2 described above, it can be recognized that, as the spot diameter increases, the temperature of the ribbon elements which form the first and second surface elements decreases and degradation of the surfaces is suppressed. Here, in the case of the example of FIG. 1 wherein Cu was added, the boundary position of the region of the appearance of no change (○) is displaced in a temperature rising direction when compared with the example of FIG. 2 wherein Si was added, and consequently, the example of FIG. 1 is superior in the resisting property against a temperature rise. Accordingly, it can be recognized that, in order to further suppress degradation of the optical modulation device by illumination of a laser beam, it is preferable to use a material of Al to which Cu is added as a material for the light illumination surface of the optical modulation device.

It is to be noted that, while the examples described above use SiN as the substrate material of the first and second surface elements, various materials such as a layered film of SiN with $SiO_2$ can be used as the material.

It can be considered that the mechanism of degradation of an Al reflection layer by illumination of a laser beam is stress migration arising from a temperature rise of the reflecting layer surface (that is, the light illumination surface) and a temperature gradient in the lengthwise direction of the Al ribbon caused by illumination of a laser beam as described hereinabove with reference to FIG. 19. Accordingly, it can be considered that this essentially is a phenomenon same as electromigration.

Further, that Al to which Cu is added is superior in resisting property than Al to which Si is added as described above coincides with a report that Al to which Cu is added is higher in resisting property than Al to which Si is added against the electromigration which appears where Al is used as a wiring line pattern of an LSI (refer to C. K. Hu et al., "Electromigration in Al(Cu) two-level structures: Effect of Cu and kinetics of damage formation", Journal Applied Physics, Vol. 74, (1993), page 969).

The report further indicates that the electromigration resisting property increases as the added amount of Cu to Al increases from 0.5 wt % to 2 wt %.

Accordingly, while FIG. 1 indicates the result only where Cu is added by 0.5 wt % to Al, it can be estimated that a similar effect can be achieved where the added amount of Cu is approximately 0.1 wt % or more and that the laser resisting property increases as the added amount of Cu increases up to approximately 5 wt %.

Therefore, in the present invention, an AlCu alloy material is used as the material for at least the light illumination surfaces of the first and second surface elements which form the optical modulation device, and more particularly, an AlCu alloy material wherein Cu is added by 0.1 wt % or more but by 5 wt % or less to Al is used.

Now, a result of examination of a deterioration suppression effect provided by employment of gas which contains hydrogen gas or helium bas or mixed gas of hydrogen gas and helium gas as the surrounding gas for the first and second surface elements of the optical modulation device is described.

Figure 3:
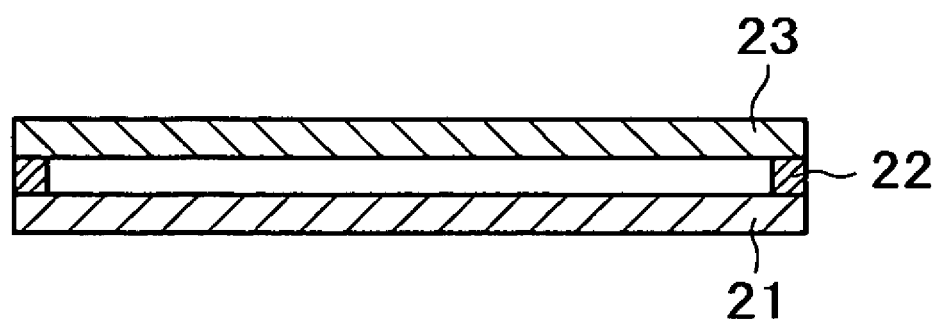
FIG. 3 is a schematic view showing a sectional configuration of an example of an optical modulation device.

FIG. 3 shows a sectional configuration of an example of an optical modulation device such as a GLV device. Referring to FIG. 3, the optical modulation device comprises a number of first and second surface elements, that is, belt-like ribbon elements (not shown) made of AlCu alloy described hereinabove or the like corresponding, for example, to the number of pixels formed on a substrate 21 made of Si or the like. The substrate 21 is covered at the periphery thereof with an optically transparent cover member 23 such as a glass plate by a seal member 22 made of a predetermined seal material, and surrounding gas such as, for example, nitrogen gas is encapsulated in the internal space defined by the substrate 21, seal member 22 and optically transparent cover member 23.

Figure 4:
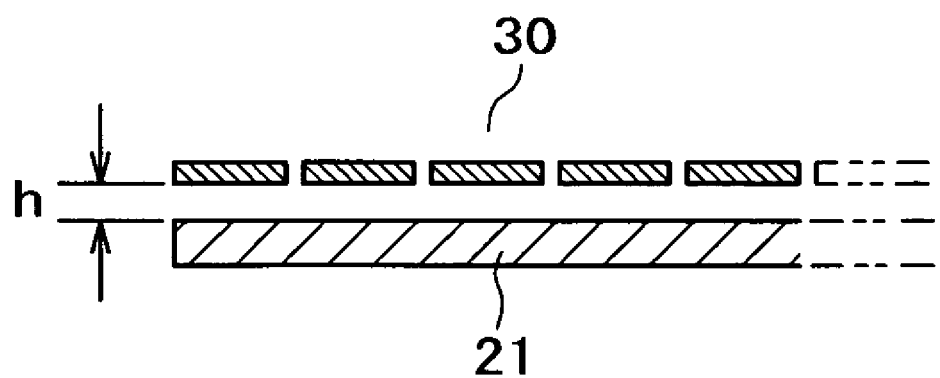
FIG. 4 is a schematic view showing a sectional configuration of part of the optical modulation device of FIG. 3.

A sectional configuration of part of the sectional configuration of FIG. 3 is shown more particularly in FIG. 4. As seen in FIG. 4, ribbon elements 30 are spaced, for example, by a height h from the substrate 21. In an ordinary GLV device, the height h is approximately 1 µm.

Figure 5:
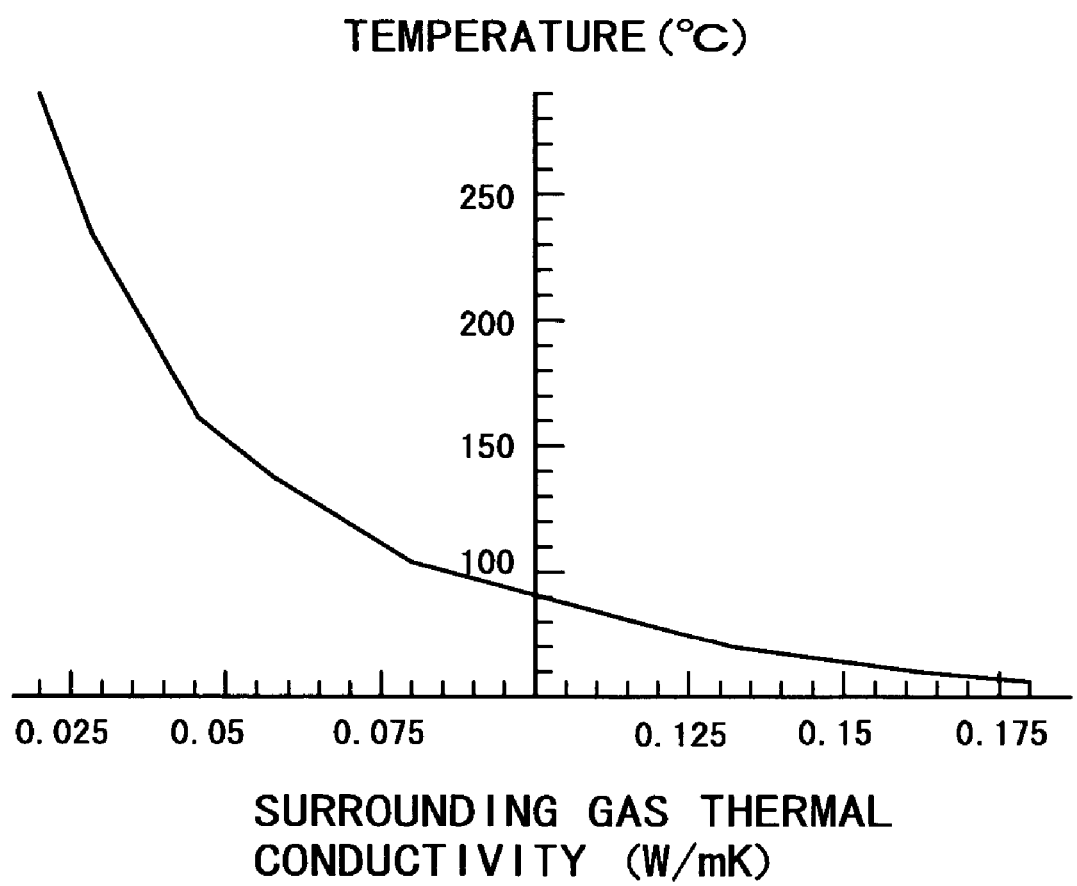
FIG. 5 is a diagram illustrating a temperature rise of an optical modulation device with respect to the thermal conductivity of surrounding gas.

In this manner, the ribbon elements 30 are spaced from the surrounding elements, and the temperature thereof is not liable to rise upon illumination of light such as a laser beam due to a heat insulating effect of the space. FIG. 5 illustrates a result of calculation of a relationship between the temperature of the ribbon elements which form the first and second surface elements and the thermal conductivity of the surrounding gas. Naturally, the temperature of the ribbon elements can be suppressed lower as the thermal conductivity increases.

In the present invention, while hydrogen gas (thermal conductivity 0.18 W/(m·K)) or helium gas (thermal conductivity 0.15 W/(m·K)) having a high thermal conductivity is used as the surrounding gas, it can be estimated that, in the space whose distance is approximately 0.1 µm as described above, the effective thermal conductivity is 0.12 W/(m·K) for hydrogen and 0.08 W/(m·K) for helium.

On the other hand, the gases are low in effective viscosity coefficient, and this has an influence on the response characteristic of a ribbon-type diffraction grating of the GLV and so forth. In particular, while, in an optical modulation device such as a GLV device, ringing, that is, oscillation of a ribbon element, occurs when the device is returned from an operative state such as an application state of a voltage to an inoperative state, it is preferable to suppress the oscillation so that the oscillation is attenuated in a shorter period of time. Where hydrogen gas or helium gas is used as the surrounding gas, the attenuation time of ringing is rather long and the response characteristic is rather low.

Accordingly, in order to raise the thermal conductivity as described above, preferably hydrogen gas or helium gas is used within a range within which at least the attenuation time does not become longer than a period of time corresponding to one pixel.

From the foregoing consideration, gas which includes gas having a high effective viscosity coefficient such as Ar or $N_2$ as a principal component and contains hydrogen gas or helium gas having a high thermal conductivity by 10% or more is preferably used as the surrounding gas.

Figure 6:
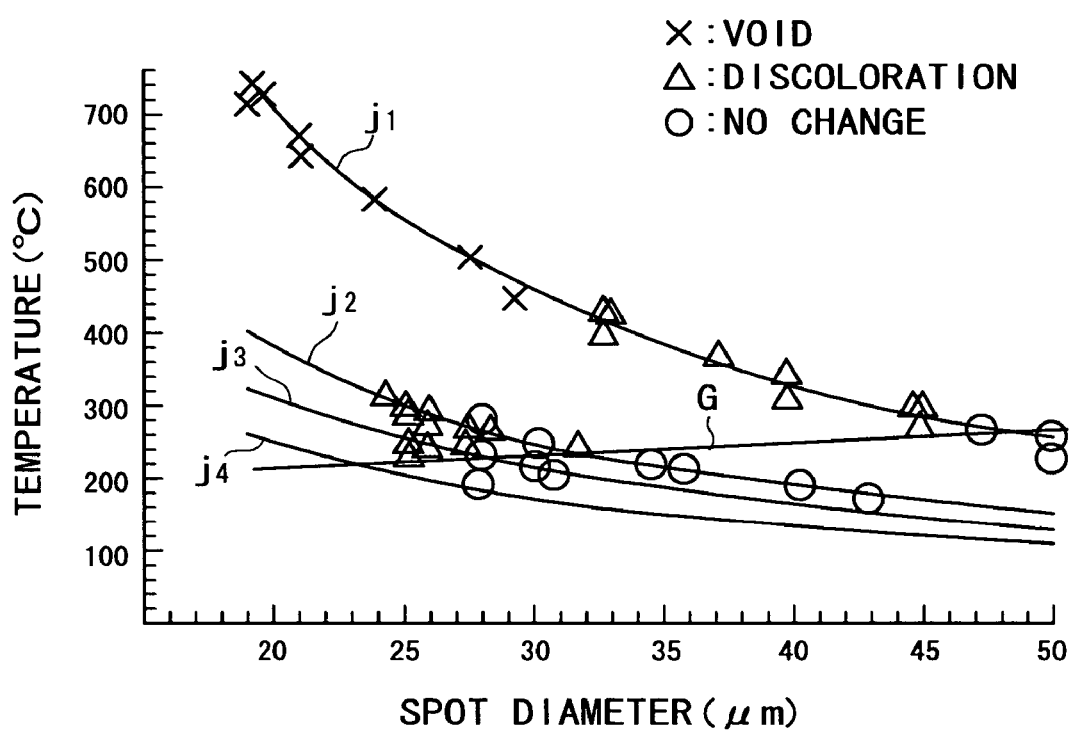
FIG. 6 is a diagram illustrating a temperature characteristic with respect to the spot diameter where gas containing hydrogen gas and helium gas is used as the surrounding gas.
Figure 7:
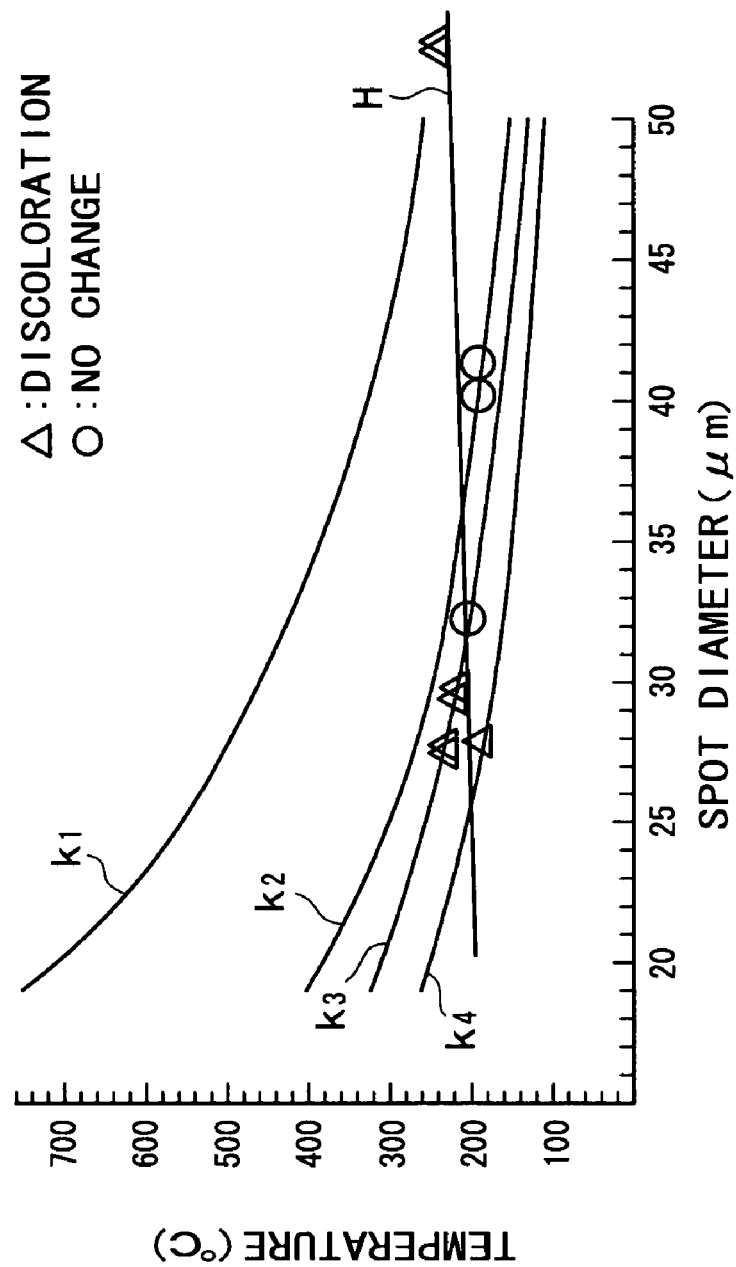
FIG. 7 is a diagram illustrating a temperature characteristic with respect to the spot diameter where nitrogen gas is used as the surrounding gas.

Results of examination of the deterioration state after a laser beam of a wavelength of 532 nm and an output power of 200 mW was illuminated for one hour on an optical modulation device wherein mixed gas of hydrogen ($H_2$) gas by 10%, He gas by 10% and $N_2$ gas by 80% was used as the surrounding gas and another optical modulation device wherein gas containing $N_2$ gas by 100% was used as the surrounding gas while alloy of Al in which Cu was mixed by 0.5 wt % was used as the light illumination surface material are illustrated in FIGS. 6 and 7, respectively.

In FIGS. 6 and 7, solid lines j1 to j4 and k1 to k4 indicate the results of observation where the transmission factor of the ND filter was set to 100%, 50%, 40% and 30%, respectively. All of the examples indicate a result of observation through a microscope of the variation of the surface of the optical modulation device when the output power of a green laser of a wavelength of 532 nm was adjusted and the spot diameter was changed while the laser beam was illuminated for one hour on the light illumination surface of the optical modulation device, that is, the surface of a ribbon element. In both of FIGS. 6 and 7, appearance of a void on the light illumination surface is represented by x; appearance of a change in color by Δ; and appearance of no change by ◯, and the spot sizes are indicated with respect to the temperature calculated by a finite element method. The boundary between the appearance of no change (◯) and the appearance of a change in color (Δ) is represented by solid lines G and H in FIGS. 6 and 7, respectively.

Similarly as in the case of the results of FIGS. 1 and 2 described hereinabove, it can be recognized that the element temperature is suppressed by making the spot diameter great. Then, from comparison between the results of FIGS. 6 and 7, it can be seen that the boundary between the appearance of no change (◯) and the appearance of a change in color (Δ) exists on the higher temperature side where surrounding gas having a higher thermal conductivity is mixed. In other words, it can be seen that, even where the temperature becomes higher, the temperature gradient at the light illumination surface can be reduced by the thermal conduction from the surrounding gas, and alteration and degradation of the surface can be suppressed and the light illumination resisting characteristic is improved.

Accordingly, gas containing hydrogen gas or helium gas or gas containing both of hydrogen gas and helium gas is preferably used as the surrounding gas for the first and second surface elements of the airtight encapsulated optical modulation device according to the present invention.

It is to be noted that, as regards the ratio at which hydrogen gas or helium gas is mixed, if it is 10% or more, then the effects of suppression of the temperature gradient by a rise of the thermal conductivity and improvement of the light illumination resisting characteristic can be achieved. On the other hand, where hydrogen gas is mixed by more than 30%, or where helium gas is mixed by more than 50%, there is the possibility that it may become necessary to take the load on the environment into consideration.

Accordingly, in the present embodiment, surrounding gas in which hydrogen gas is mixed preferably by 10% or more but 30% or less or helium gas is mixed preferably by 10% or more but 50% or less is used.

[2] Second Embodiment

Now, another embodiment is described wherein the distance between the first and second surface elements of the optical modulation device is selected to raise the diffraction efficiency thereby to reduce the output power of illumination light such as a laser beam to suppress degradation by light illumination.

For example, the following two types are available for a GLV device which is suitably applied as an optical modulation device.

Figure 8:
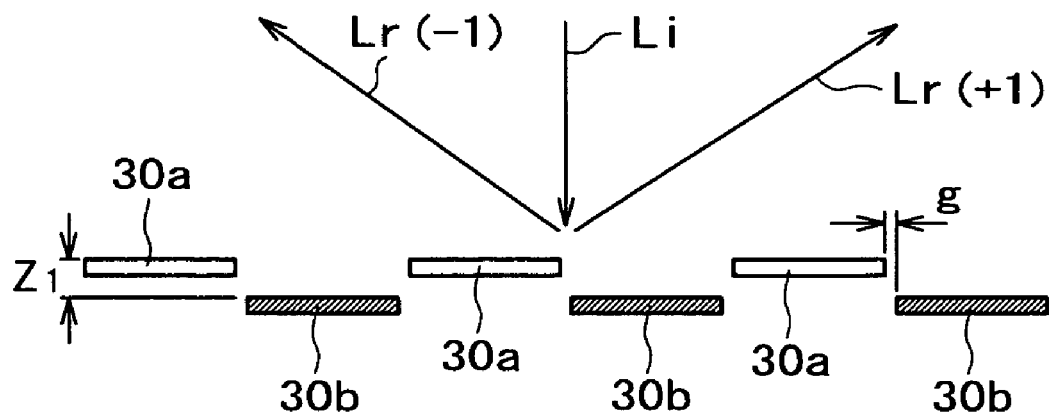
FIG. 8 is a schematic view showing an example of an optical modulation device.
Figure 9:
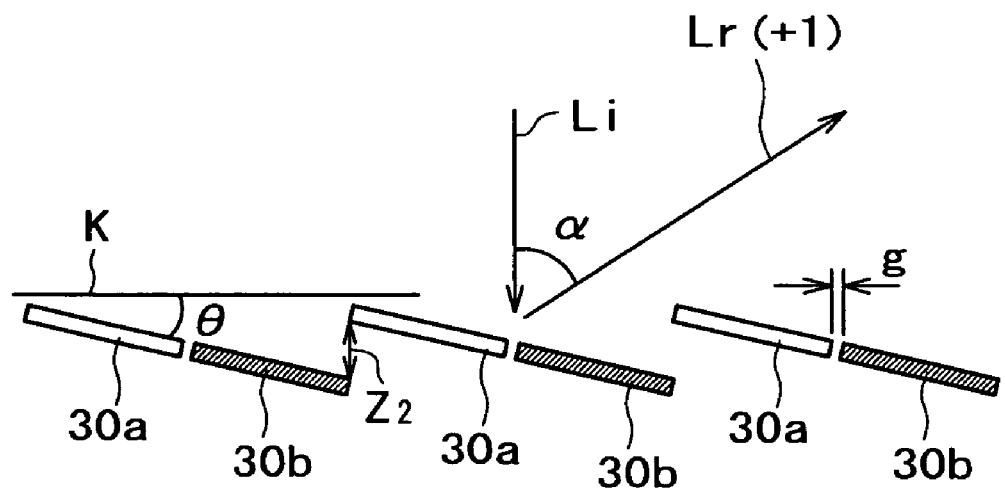
FIG. 9 is a schematic view showing an example of a brazed optical modulation device.

As different types of the GLV device mentioned hereinabove, an ordinary GLV wherein the surfaces of the ribbons, that is, the surfaces of the first and second surface elements, are disposed on a substantially same plane when the GLV device is inoperative and a brazed GLV wherein the ribbons, that is, the first and second surface elements, are disposed in an inclined relationship by an angle θ with respect to a reference plane (for example, a plane parallel to the surface of the substrate of the optical modulation device) have been proposed. Manners of operation of an example of the GLV elements of the types described are schematically illustrated in FIGS. 8 and 9, respectively. Referring to FIGS. 8 and 9, reference character 30*a* denotes a first surface element (for example, a fixed ribbon), 30*b* a second surface element (for example, a movable ribbon), Li incoming light, and Lr(+1) and Lr(−1) denote ± first-order diffraction lights, respectively.

In the example of the ordinary GLV device upon operation illustrated in FIG. 8, if the movement amount z1 of the second surface elements 30*b* is $\lambda/4$ where $\lambda$ is the wavelength of the incoming light, then 0th-order diffraction light (not shown) which is reflected reversely to the incoming direction and ±first-order diffraction lights Lr(+1) and Lr(−1) are reflected as diffraction lights. Thus, for example, if only the 0th-order diffraction light is utilized, then the only one diffraction light can be used to form an image on a screen through a spatial filter so as to be utilized to display an image.

On the other hand, in the brazed GLV device, the first surface elements 30*a* and the second surface elements 30*b* are disposed in an inclined relationship by an angle θ with respect to the reference plane K as seen in FIG. 9. Then, in one state, the second surface elements 30*b* are moved until the surface of each of them lies in the same plane as that of one of the first surface elements 30*a* which is positioned adjacent the second surface element 30*b* such that the optical path difference z2 between each pair of ribbons juxtaposed on one plane and another pair of ribbons juxtaposed on another plane may be $\lambda/2$ where $\lambda$ is the wavelength of the incoming light, then only + first-order diffraction light goes out. Accordingly, it is possible to use the + first-order diffraction light to form an image on a screen through a spatial filter. In FIGS. 8 and 9, reference character g denotes the distance between the first surface element 30*a* and a second surface element 30*b*.

Where one of reflected diffraction lights is utilized in this manner, an image can be displayed at a high diffraction efficiency of, for example, 60% or more. For image display apparatus such as projectors, a brazed GLV device which exhibits a moderate response characteristic to the applied voltage from a dark level to a middle gradation and is easy to display an image of high gradations.

Figure 10:
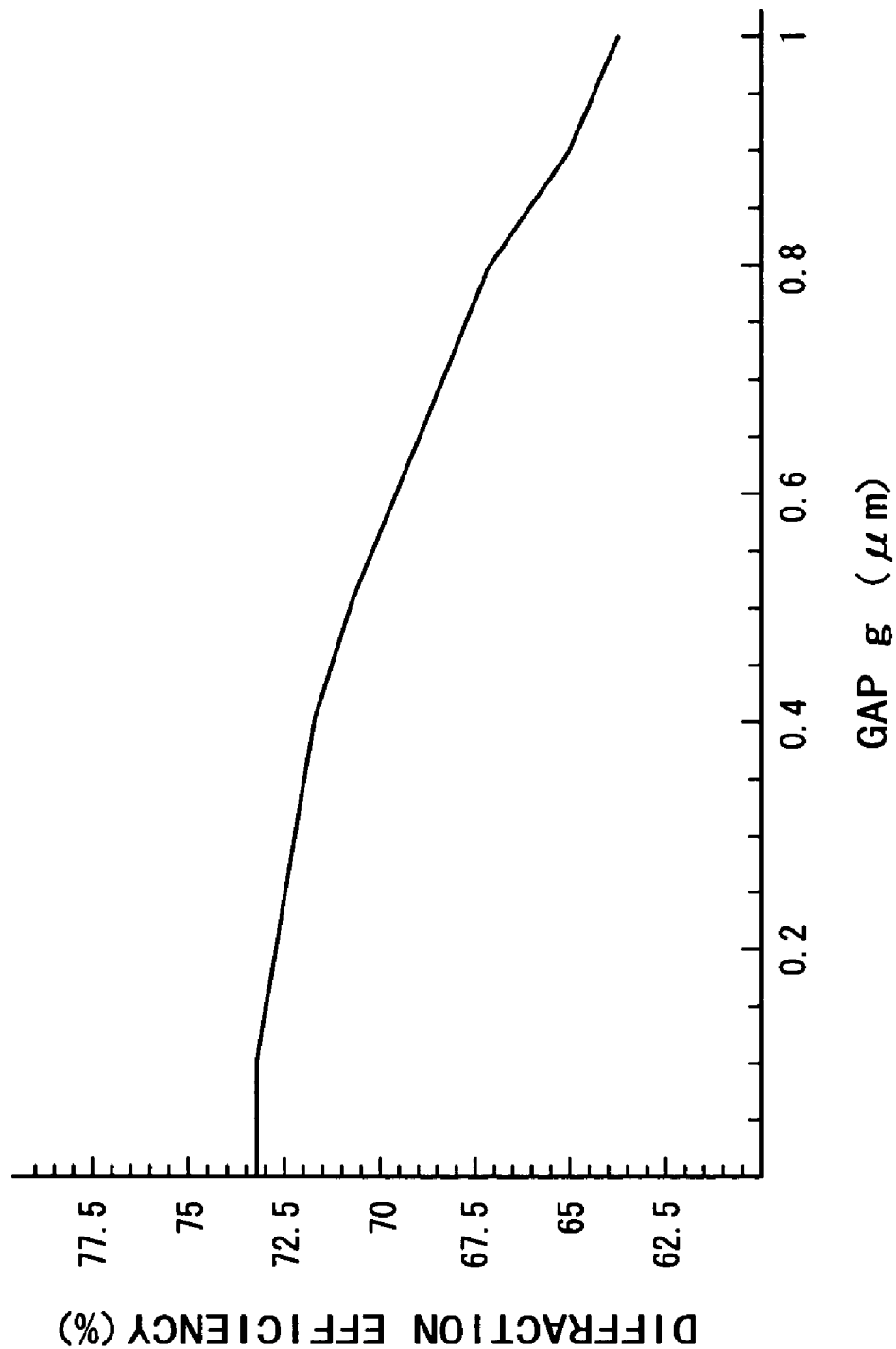
FIG. 10 is a diagram illustrating a variation of the diffraction efficiency with respect to the distance between the first and second surface elements of an optical modulation device of an ordinary type.
Figure 11:
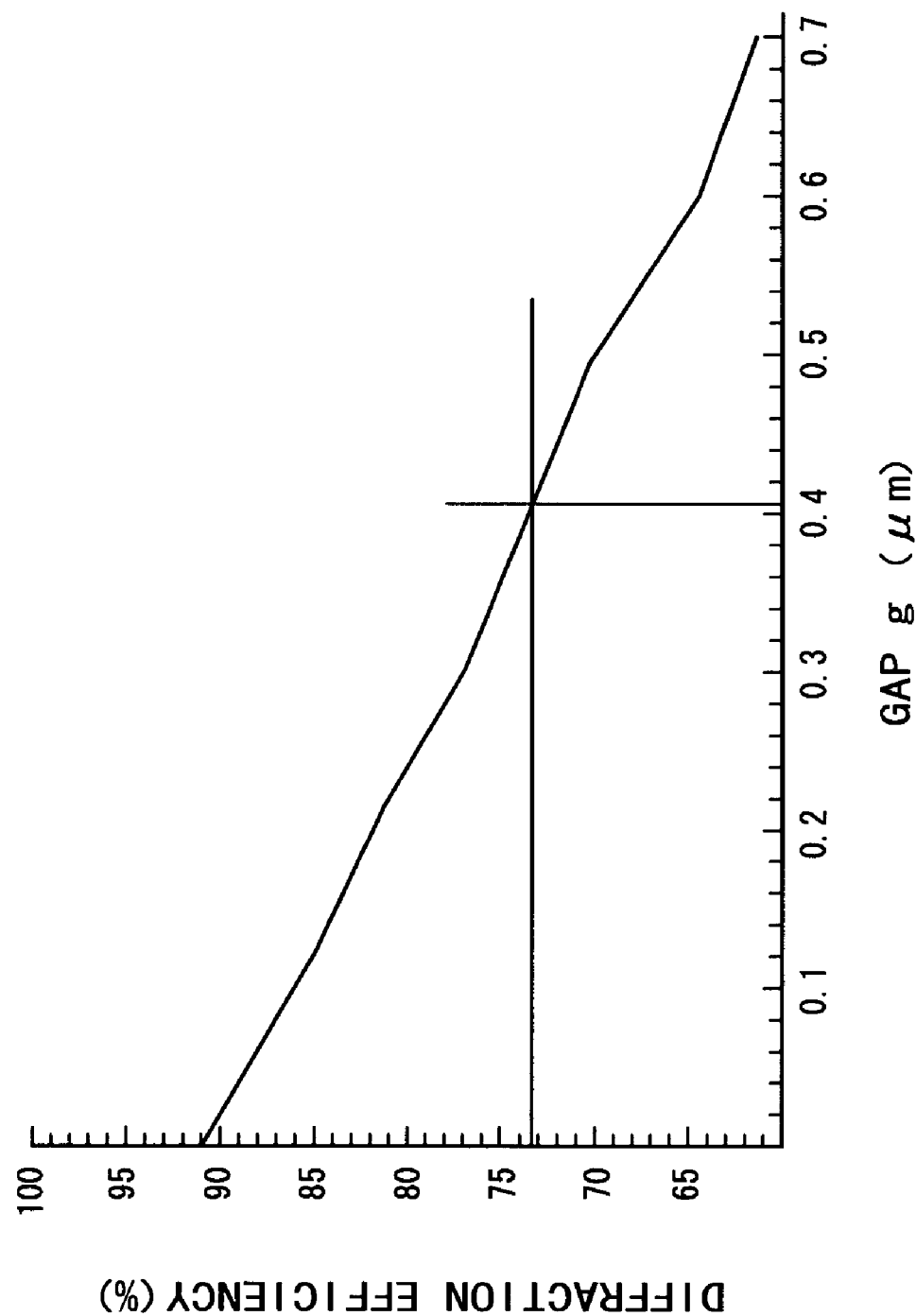
FIG. 11 is a diagram illustrating a variation of the diffraction efficiency with respect to the distance between the first and second surface elements of a brazed optical modulation device.

FIGS. 10 and 11 illustrate variations of the diffraction efficiency with respect to the distance between first and second surface elements, that is, between ribbons, that is, the distance denoted by g in FIGS. 8 and 9 in optical modulation devices of the ordinary GLV configuration and the brazed GLV configuration described hereinabove with reference to FIGS. 8 and 9, respectively.

In the ordinary GLV device, even where the gap g is set to 0 μm, the upper limit to the diffraction efficiency is 73%. However, in the brazed GLV device, the diffraction efficiency increases as the gap g decreases, and it can be seen that, where the gap g is smaller than approximately 0.4 μm, the upper limit to the diffraction efficiency exceeds the upper limit to the diffraction efficiency of the ordinary GLV device.

As the diffraction efficiency of the GLV device increases, the output power of a laser beam for obtaining an equal luminance can be suppressed lower, and as a result, the reliability of the GLV device with which a high luminance projector is formed rises. Further, as the gap g between adjacent first and second surface elements decreases, also the laser power which directly passes the portion and comes to and is absorbed by the substrate made of Si or the like can be reduced, and consequently, a temperature rise at the first and second surface elements can be suppressed.

Accordingly, it can be recognized that, by using the brazed GLV device for an optical modulation device and setting the distance between first and second surface elements of the optical modulation device to 0.4 μm or less as described above, an image projection method and an image display apparatus which are higher in efficiency and higher in light illumination resisting property and reliability can be provided.

Although it is desirable to make the gap g smaller than 0.4 μm and as small as possible, it is difficult to set the gap g smaller than 1 μm because this degrades the effect of radiation of heat through the surrounding gas between the ribbon elements and from a problem of the reliability arising from the limitation in manufacture by lithography or the like. Further, in practical use, if the distance between the first and second surface elements of an optical modulation device is reduced to a very small dimension, then there is the possibility that, in an operation state of the optical modulation device upon application of a voltage or the like, the surface elements may move laterally to cause a problem of sticking between them although it depends upon the shape, thickness and so forth of the first and second surface elements. Accordingly, in the present invention, the distance between the first and second surface elements is preferably set to 0.1 μm or more but 0.4 μm or less.

[3] Third Embodiment

Figure 12:
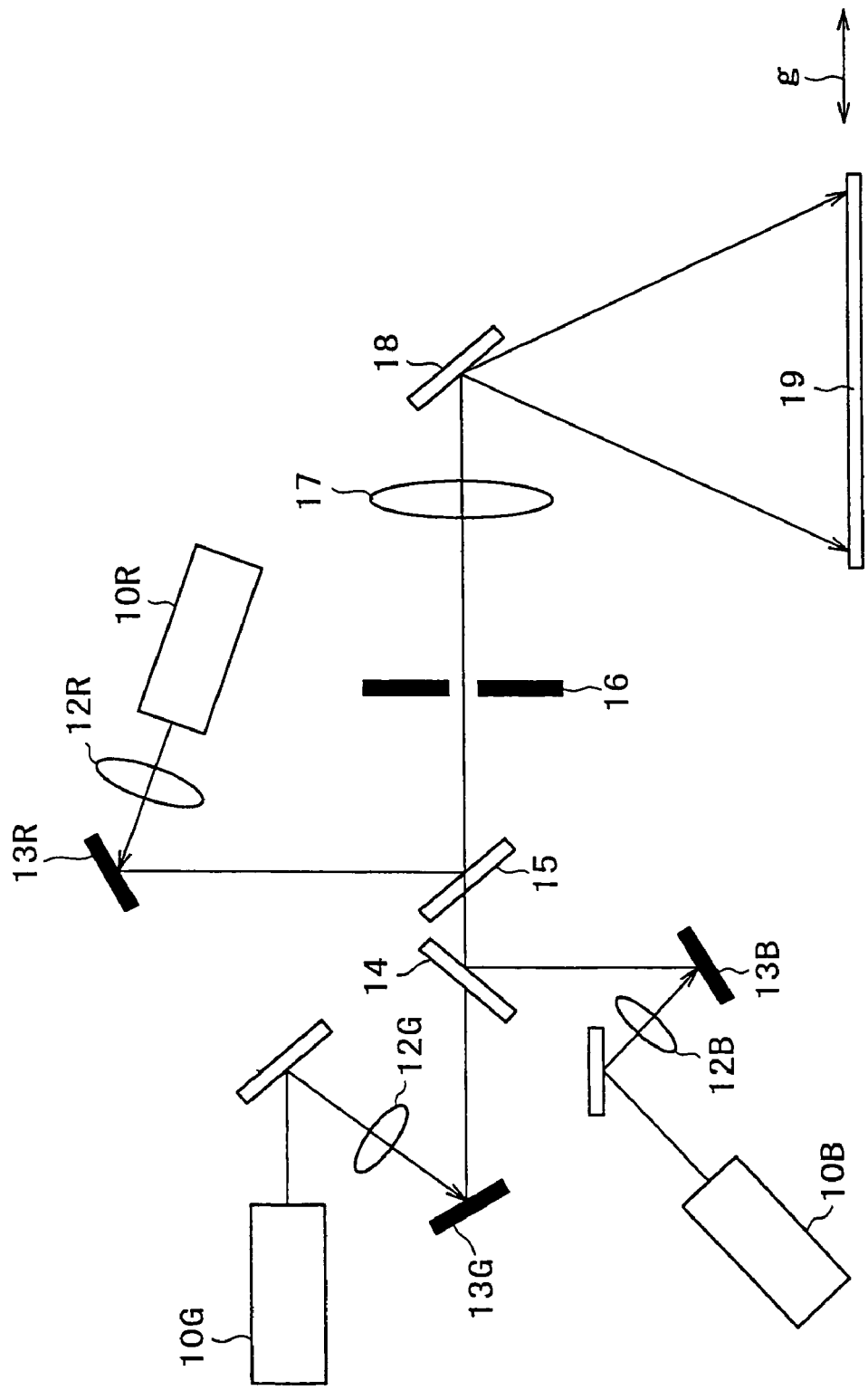
FIG. 12 is a schematic view showing a general configuration of an example of an image display apparatus.

Now, an example of an image display apparatus which employs an optical modulation device having the configuration of the present invention is described with reference to FIG. 12. The image display apparatus includes light sources 10R, 10G and 10B such as red, green and blue lasers. Laser beams emitted from the light sources 10R, 10G and 10B are introduced into optical modulation devices 13R, 13G and 13B of the diffraction grating type such as, for example, GLV devices described hereinabove through condenser lenses 12R, 12G and 12B, respectively.

The optical modulation devices 13R, 13G and 13B may be disposed at positions displaced from a beam waist position at which the laser beams are condensed by the condenser lenses 12R, 12G and 12B.

Diffraction lights from the optical modulation devices 13R, 13G and 13B are converged into a single flux of light, for example, by half mirrors 14 and 15, pass through a spatial filter 16 and are projected by a projection lens 17 to form an image on a screen 19. The thus formed image is scanned in a horizontal direction of the screen 19 as indicated by an arrow mark g in FIG. 12 by a scanner 18.

The optical modulation devices 13R, 13G and 13B may each be configured such that, for example, optical modulation devices wherein a diffraction grating is formed by relative movement of the first and second surface members as described hereinabove, or more particularly, GLV devices wherein, for example, three movable ribbons and three fixed ribbons are disposed alternately, are arranged in a one-dimensional array. In other words, an optical modulation device is used wherein movable ribbons and fixed ribbons are disposed alternately and, by application of a voltage to the movable ribbons or the like, the reflecting surfaces of the ribbons, that is, the first and second surface elements, are moved relative to each other to form a diffraction grating to perform optical modulation.

While the representative configuration example of the GLV device described above includes the alternate arrangement of three fixed ribbons and three movable ribbons, it is otherwise possible to dispose a number of GLV elements equal to the number of pixels, for example, 1,080 GLV elements, in a widthwise direction of the ribbons to form an optical modulation device.

A collimated light condensed to a predetermined spot size in the ribbon lengthwise direction and collimated to a predetermined width in the ribbon widthwise direction using a cylindrical lens is illuminated upon the optical modulation device of the one-dimensional configuration while a voltage corresponding to an image signal is applied to each of the GLV elements. Thereupon, the diffraction light diffracted from the optical modulation device forms a beam having a predetermined one-dimensional pixel size (length and width) and modulated in accordance with the image signal. On the other hand, if the spatial filter 16 is disposed, for example, on a Fourier plane, the image is provided with a one-dimensional configuration wherein it extends in a direction perpendicular to the one-dimensional extension direction and is displayed, on the screen 19, as an image extending in a direction perpendicular to the arrow mark g. The image is scanned in the direction indicated by the arrow mark g by the scanner 18 so that it is displayed as a two-dimensional image.

In the image display apparatus having such a configuration as described above, by using an AlCu alloy material as the material for the light illumination surfaces of the first and second surface elements of the optical modulation devices and using gas containing hydrogen gas or helium gas or containing both of hydrogen gas and helium gas as the surrounding gas, the degradation by light illumination is suppressed. Consequently, the image display apparatus is superior in the durability and the reliability when compared with conventional image display apparatus.

Further, by using a GLV device of the brazed configuration described above for the optical modulation devices and setting the distance between the first and second surface elements of the diffraction gratings of the GLV devices to 0.4 μm or less, the diffraction efficiency can be raised and high luminance display with a comparatively low output power can be achieved, and besides improvement in the durability and the reliability can be anticipated.

Furthermore, by disposing, in such an image display apparatus as described above, an optical modulation device at a position displaced from a beam waist position of light condensed by a condenser lens so that the optical modulation device is illuminated in a defocused state, the spot diameter can be increased when compared with a conventional method wherein an optical modulation device is disposed at a focused position. Consequently, suppression of a temperature rise and a temperature gradient at the surface of the optical modulation device can be anticipated and reduction of the degradation of the optical modulation device can be anticipated.

Further, even if an optical modulation device is disposed at a defocused position, by using an image at the beam waist position of diffracted light to form an image, an image of a substantially desired pixel size can be projected on a screen.

Figure 13:
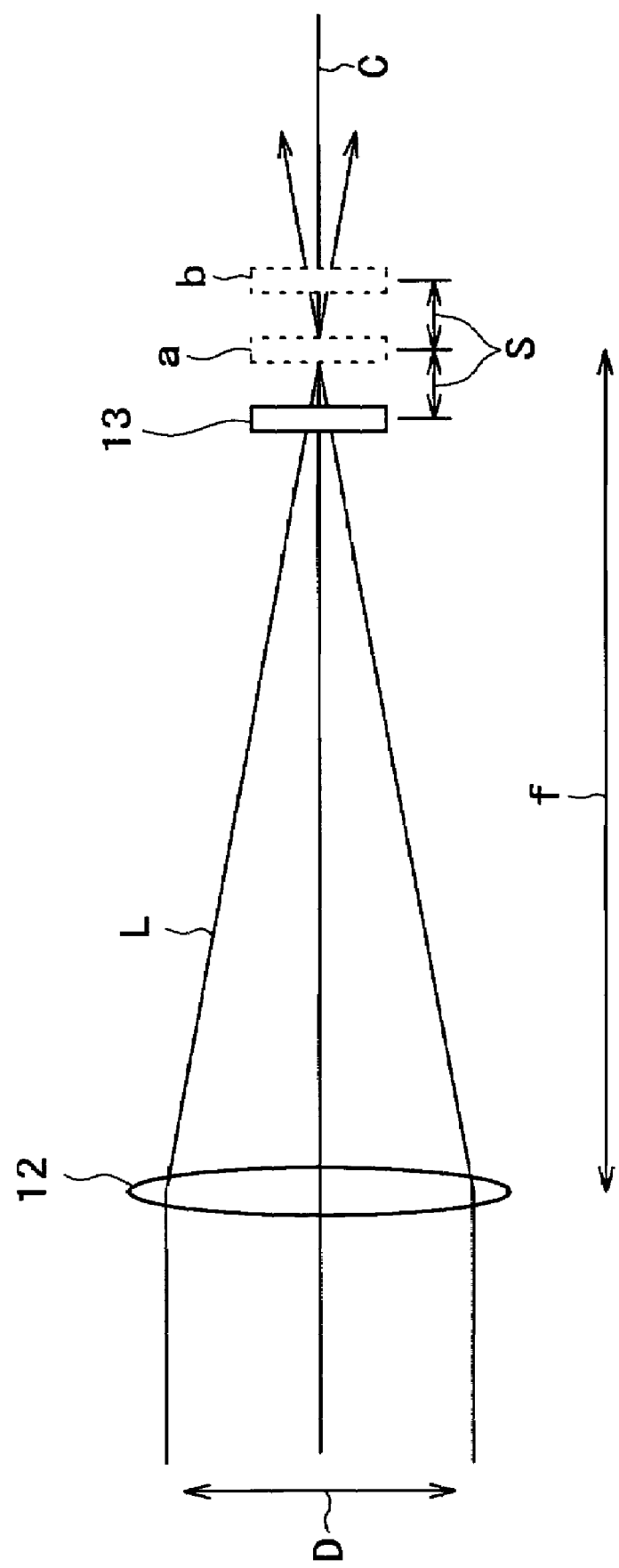
FIG. 13 is a schematic view showing part of the image display apparatus of FIG. 12.

In the present embodiment, as schematically shown in FIG. 13 which shows an arrangement configuration of an example of an image projection method, each optical modulation device 13 is disposed at a position displaced by a defocus amount s from the beam waist position indicated by a broken line a at which light is condensed by a condenser lens 12. The position displaced by the defocus amount s may be a position nearer to the condenser lens 12 from the beam waist position or another position farther from the condenser lens 12 than the beam waist position as indicated by a broken line b in FIG. 13.

In FIG. 13, a solid line c indicates the optical axis of the condenser lens 12, and f the focal length.

Then, where a single light L emitted from a light source is used and modulated by an optical modulation device and then projected through a spatial filter to a screen to form an image on the screen, the light of the beam diameter D is illuminated over a substantially overall area of the numerical aperture of the condenser lens 12 by which light is condensed on the optical modulation device 13.

Figure 14:
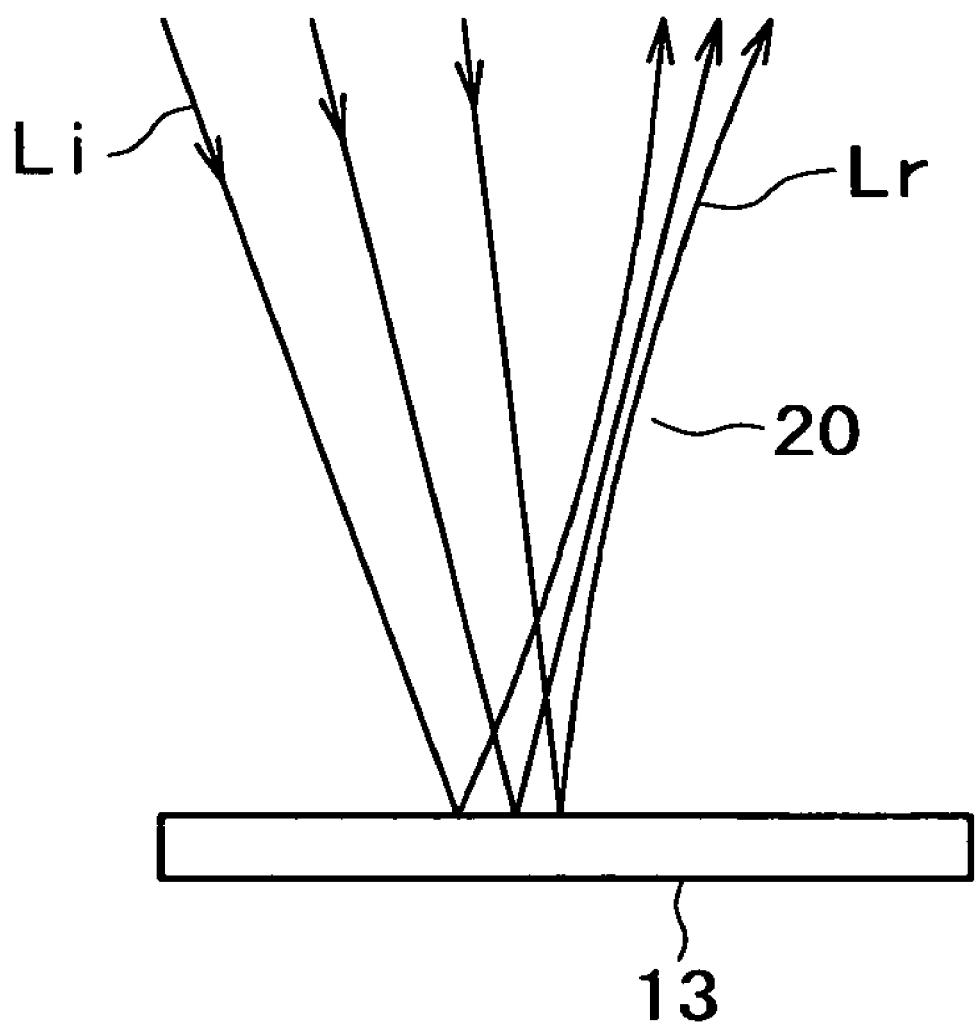
FIG. 14 is a schematic view illustrating a beam waist position.

Further, the diffraction lights from the optical modulation device 13 disposed at a position displaced from the beam waist position 20 is displaced from the surface of the optical modulation device 13 as seen in FIG. 14, in the present embodiment, an image of one of the diffracted lights at the beam waist position is used to form an image by means of an image forming optical system.

An example of consideration of the defocus amount s where such a single light as just described is used is described now. The numerical aperture NA of the condenser lens 12 is given as $$NA \sim D/(2 \times f)$$

where D is the effective aperture of the lens as described hereinabove, and in this instance, it is assumed that the effective aperture D is equal to the diameter of the single beam L. Further, f is the focal length.

The numerical aperture NA is utilized fully to condense the beam L in the ribbon lengthwise direction of the optical modulation device 13 formed from a GLV device or the like. Where the spot diameter in the ribbon lengthwise direction is represented by $2\omega 0$, it is given as $$2\omega 0 \sim 0.635 \times \lambda / NA$$

Where the focal depth with which the spot diameter becomes equal to $\sqrt{2}$ times the beam waist diameter is represented by $\pm z0$, it is given as $$z0 = \pi \times \omega 0 / \lambda$$

In order to reduce the crosstalk, it is preferable to make the focal depth as small as possible. This is described more particularly. First, since light diffracted by the optical modulation device 13 is defocused, it Fraunhofer diffracts while it propagates from the surface of the optical modulation device 13 to the focus position and therefore has some spread on the screen on which it is projected. It is necessary to suppress crosstalk caused by such spread, that is, an overlap between pixels, to a certain level or less.

Figure 15:
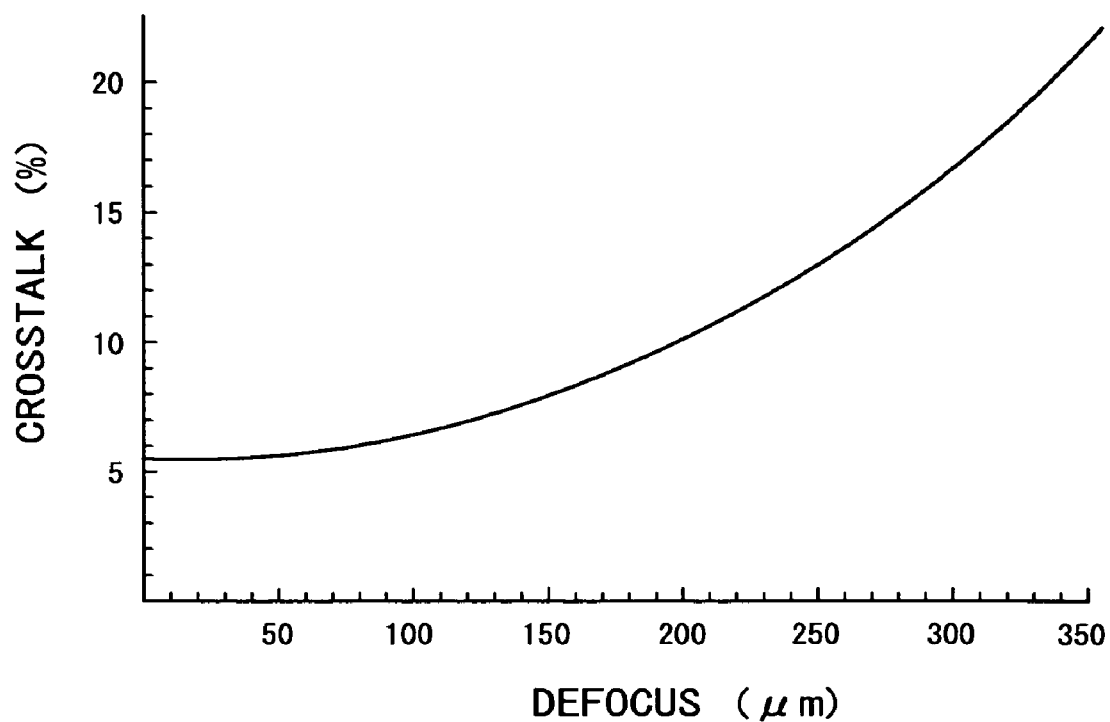
FIG. 15 is a diagram illustrating a relationship between the defocus and the crosstalk.

FIG. 15 illustrates a relationship between the defocus amount and the crosstalk amount. The example shown in FIG. 15 indicates a result of scalar diffraction calculation of a relationship between the crosstalk between pixels and the defocus amount where an optical modulation device is formed using a brazed GLV device whose pixel size is 25.5 μm. As seen from FIG. 15, although the crosstalk increases monotonously as the defocus amount increases, the crosstalk particularly at the defocus of 200 μm is approximately 11% and comparatively low. It is necessary to select a defocus amount in accordance with the crosstalk required from a picture quality performance.

An example is described below wherein, where a single beam from a light source is used and an optical modulation device is formed from GLV elements arranged in a one-dimensional array, the numerical aperture NA of the lens is selected so that the focal depth may be comparatively short, for example, 10 μm or less taking the selection conditions of the defocus amount into consideration.

As an example, if the numerical aperture NA is selected to NA=0.125, then $$2\omega 0 \sim 2.7 \ \mu m$$

$$z0 \sim 10.8 \ \mu m$$

and the focal depth can be suppressed to several tens μm or less. Then, the optical modulation device 13 is disposed not at the beam waist position but at a position defocused, for example, to +s (to the side nearer to the condenser lens 12) from between ±s.

Where the pixel size of the optical modulation device 13 is approximately 25 μm, the defocus amount s is selected so that the spot diameter on the surface of the optical modulation device 13 may be greater than the pixel size, for example, the spot diameter in the ribbon lengthwise direction may be 50 μm. If the ribbon length is 200 μm, then since the spot diameter of 50 μm is sufficiently smaller than the ribbon length of 200 μm, it can be prevented to allow the light to be illuminated beyond a deformed portion of a ribbon by application of a voltage, and consequently, a drop of the diffraction efficiency can be ignored. The defocus amount s with which the spot diameter becomes 50 μm is 200 μm if it is assumed that the incoming light is a Gaussian beam whose propagation constant $M^2=1$.

In this manner, if defocus illumination with which the spot diameter becomes 50 μm in the ribbon lengthwise direction and an image of the surface of the optical modulation device 13 is formed on the screen by the image forming optical system, then the image has a rectangular shape having a width of 50 μm and a length of 25.5 μm and hence having an aspect ratio of approximately 2:1 and therefore cannot be used. In this instance, the image forming optical system is configured so that a face which provides a spot diameter of approximately 25.5 μm in the ribbon lengthwise direction may be projected on the screen. It is to be noted that the spot diameter in the ribbon widthwise direction does not change because light collimated by the condenser lens 12 is illuminated as described hereinabove.

As described above, the first and second surface elements of the optical modulation device 13 are formed from AlCu alloy and gas containing hydrogen gas or helium gas or both of hydrogen gas and helium gas is used as the surrounding gas, and the optical modulation device 13 is defocus illuminated with the defocus amount of, for example, 200 μm while a face of a substantially pixel size different from the surface of the optical modulation device 13 is projected on the screen to form an image by the image forming optical system. Consequently, the influence of light illuminated on the first and second surface elements is further suppressed to suppress the temperature gradient, and therefore, an image of a high resolution wherein the degradation is suppressed and increase of the crosstalk is suppressed can be displayed.

[4] Fourth Embodiment

Now, an example is described wherein defocused illumination described above is applied to the image display apparatus described hereinabove with reference to FIG. 12 wherein the material for the first and second surface elements and the surrounding gas are selected and a plurality of lights emitted from a light source are modulated by an optical modulation device and projected on a screen through a spatial filter to form an image on the screen. In this instance, a beam of a beam diameter d is illuminated by dividing the numerical aperture of the condenser lens 12 spatially substantially equally.

For example, it is usually very difficult under present conditions to acquire RGB (red, green and blue) lasers of a high output power of 50 to 100 W or more individually as single lasers, and therefore, it cannot be avoided to use at least two lasers, for example, 5 to 50 lasers of an output power of 10 W in combination.

Figure 16:
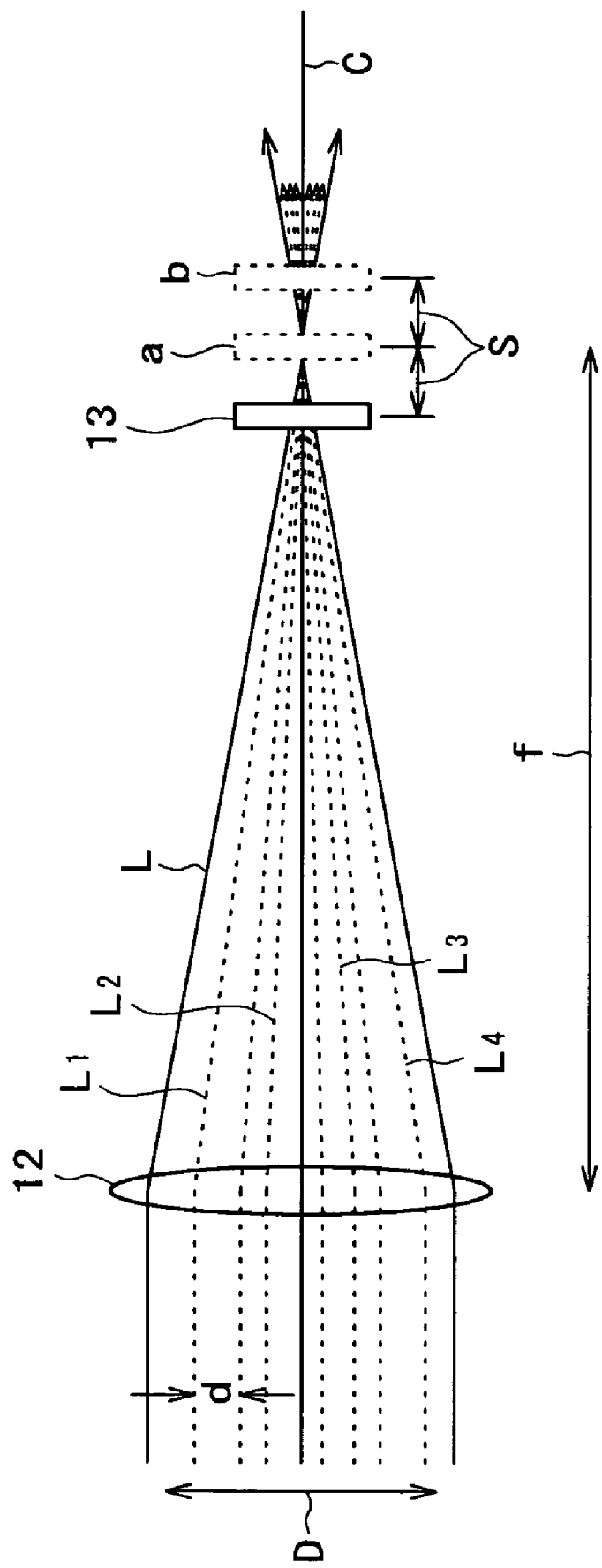
FIG. 16 is a schematic view illustrating an example of an image projection method.

In this instance, as seen from a schematic configuration shown in FIG. 16, a plurality of lights L1, L2, L3, L4, . . . emitted from a light source are illuminated such that they individually have a beam diameter d and divide the effective aperture D of the condenser lens 12 spatially substantially equally in the ribbon lengthwise direction of the optical modulation device 13.

By dividing the effective aperture of the condenser lens 12 spatially substantially equally with a plurality of laser beams in this manner, the effective aperture of the condenser lens 12 can be utilized fully to set a uniform defocus amount to the optical modulation device.

Now, an embodiment which uses a plurality of incoming lights in this manner is described.

In this instance, where the beam waist of each of the plural beams is represented by $2\omega 0'$, it is given as $$2\omega 0 \sim 1.27 \times f \times \lambda / d$$

and where the focal depth is represented by $\pm z0'$, it is given as $$z0' = \pi \times \omega 0'^2 / \lambda$$

More particularly, if the numerical aperture NA is NA=0.125 and the focal length f is f=40 mm while the beam diameter d is d=2 mm, then $2\omega 0' \sim 13.5$ μm and $z0'=269$ μm.

In this manner, where a plurality of beams are used, the focal depth does not become less than several tens μm. This is because a beam having a comparatively small beam diameter is restricted moderately and hence expanded. However, the beam spot diameter $2\omega(m)$ of the entire multi beams changes to $$2\omega(m) \sim 2NA \times s$$

with respect to the numerical aperture NA of the lens. Accordingly, if the multi beams are used for defocused illumination with the defocus amount s~200 μm similarly as in the case of a single beam, then the spot diameter on the surface of the optical modulation device can be set to 50 μm in the ribbon lengthwise direction. It is to be noted that, where a plurality of lasers are used, since a phase difference is not kept between the lasers, resulting beams do not make coherent light and a spot whose intensity is a simple sum of the intensities of the beams is obtained.

As described above, in both of a case wherein a single incoming light is used and another case wherein a plurality of incoming lights are used, by selecting the numerical aperture NA of the condenser lens under the condition that the focal depth z0 becomes smaller than several tens μm and selecting the incoming conditions to the lens in such a manner as described above, the spot diameter on the surface of the optical modulation device can be increased up to approximately 50 μm in the ribbon lengthwise direction with a small defocus amount of approximately 200 μm.

Further, while the spot diameter on the surface of the optical modulation device is preferably made as large as possible in order to prevent degradation of the ribbons as described above, the upper limit to the spot diameter is defined by a drop of the diffraction efficiency or by a condition for avoiding increase of stray light from a wiring line pattern existing on the outer side of the ribbon pattern. For example, where a typical GLV element is used to form an optical modulation device, since the pixel size is 25.5 μm and the ribbon length is 200 μm, a defocus amount with which the spot diameter becomes approximately 50 μm satisfies two conditions of suppression of deterioration of the ribbons and suppression of a drop of the diffraction efficiency.

Now, a result of examination of effects where the spot diameter is set to approximately 50 μm commonly in the third and fourth embodiments described hereinabove is described.

Figure 17:
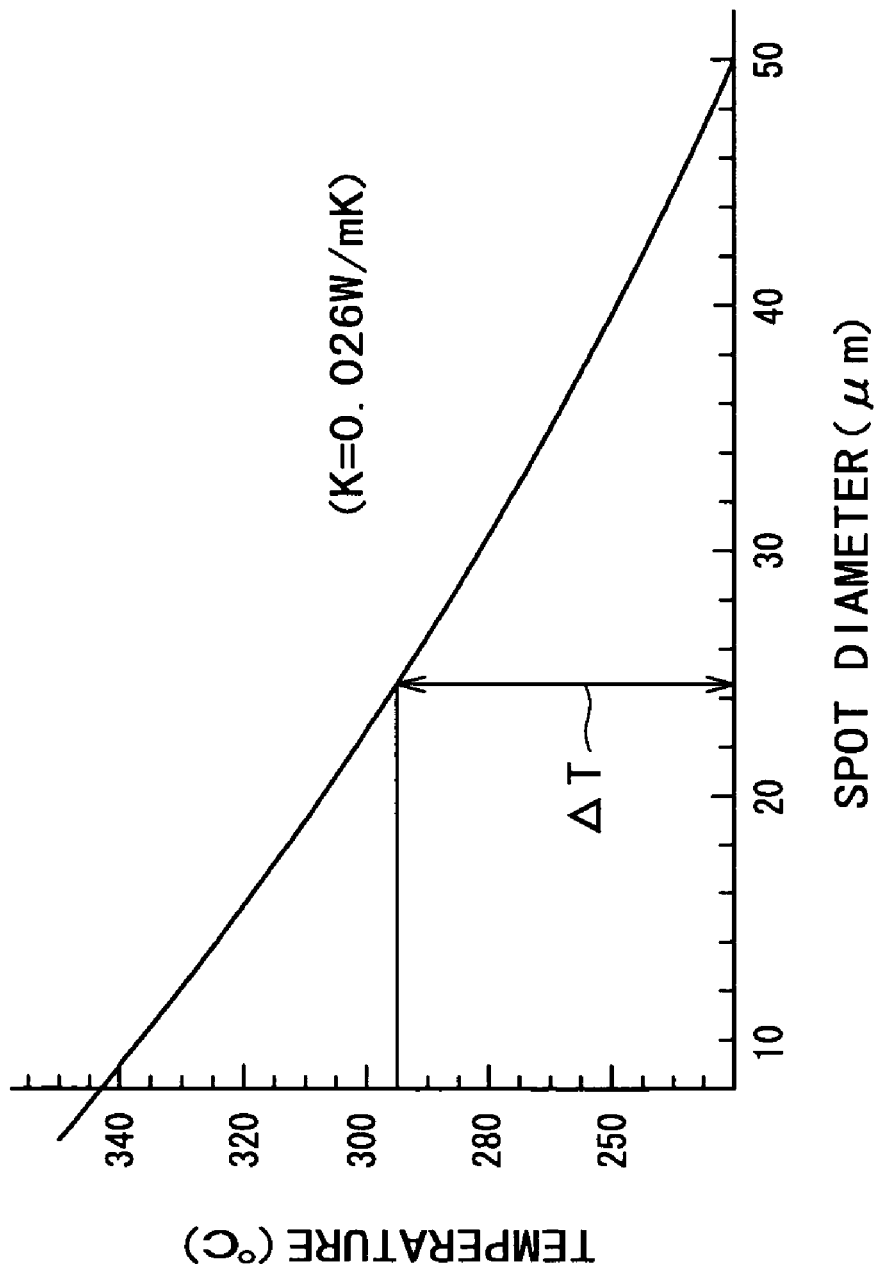
FIG. 17 is a diagram illustrating a temperature characteristic of the spot diameter.

A result of calculation of a relationship between the spot diameter in the ribbon lengthwise direction of an optical modulation device and the temperature of the ribbons using a finite element method is illustrated in FIG. 17. Although the ribbon temperature is approximately 295° C. where the spot diameter is 25 μm, it drops to approximately 240° C. where the spot diameter increases to 50 μm. In particular, the temperature difference where the spot diameter is 50 μm and 25 μm denoted by ΔT in FIG. 17 is approximately 55° C. Also the temperature gradient at the distance of approximately 20 μm from the center of the spot is smaller by approximately 1/1.5 where the spot diameter is 50 μm.

Further, it is apparent that the temperature rise is suppressed and the degradation of the surface is suppressed by increasing the spot diameter from approximately 20 μm to approximately 50 μm in the measurement results where the first and second surface elements of the configuration of the present invention described hereinabove with reference to FIGS. 1 and 6 are made of an AlCu alloy material and gas which contains hydrogen gas or/and helium gas is used as the surrounding gas. Thus, it can be recognized that the degradation of the optical modulation device can be suppressed and the reliability can be raised by employment of the defocus illumination.

Accordingly, in the present invention, it can be recognized that, where, for example, a GLV type optical modulation device is used, by illuminating the surface of the optical modulation device with a spot size of approximately 50 μm in the ribbon lengthwise direction (approximately 25.5 μm in the ribbon widthwise direction) while an image is formed on the screen such that the spot diameter is 25.5 μm in the ribbon lengthwise direction and further preferably by selecting the defocus amount so that the crosstalk between pixels described hereinabove with reference to FIG. 15 may be smaller than a limit value determined from an image characteristic, even when display of a high luminance of approximately 10,000 [lm] is performed, the temperature rise of the optical modulation device can be suppressed and the temperature gradient can be reduced. Consequently, degradation of the ribbons of the optical modulation device can be suppressed and appearance of a void or hillock can be suppressed with certainty, and an image of a high resolution can be displayed stably for a long period of time.

As described above, in the present invention, by forming the first and second surface elements which form a diffraction grading of an optical modulation device from an AlCu alloy material and using gas which contains hydrogen gas or helium gas or both of hydrogen gas and helium gas as the surrounding gas for the first and second surface elements, sudden appearance of a temperature gradient by a temperature rise of the surface of the optical modulation device can be suppressed to suppress the degradation of the surface of the optical modulation device sufficiently to achieve improvement of the reliability and elongation of the life.

Further, where a brazed GLV device is used as the optical modulation device, by setting the distance between the first and second surface elements to 0.4 μm or less, a high diffraction efficiency can be achieved. Consequently, the light illumination intensity of a laser or the like can be suppressed, and improvement in the light illumination resisting property and the reliability can be achieved similarly.

Further, in the image display apparatus to which the optical modulation device according to the present invention is applied, by disposing the optical modulation device at a position displaced from the beam waist position at which the light is condensed by the condenser lens to perform defocused illumination, also where a laser beam of a comparatively high output power is illuminated upon the optical modulation device to perform display of a high luminance of approximately 10,000 [lm] and also where the optical modulation device is applied to display of a higher luminance, deterioration of the optical modulation device by a temperature rise can be suppressed. Consequently, a high luminance display apparatus having a high degree of reliability can be achieved.

Further, not only where the optical modulation device is applied for high luminance display of approximately 10,000 [lm], but also where a light flux of approximately several thousands to one thousand [lm] lower than 10,000 [lm] is used such as where a beam of a laser is illuminated on a GLV type optical modulation device of a small size of approximately 0.5 inches or a small-size optical modulation element of a smaller size of approximately 0.3 inches, by applying the present invention to a case wherein the illumination density of the light illumination surface of the optical modulation device is high and the temperature rise is high, the degradation of the optical modulation device can be suppressed and the reliability for a long period of time can be assured.

Further, by applying the present invention, an image display apparatus wherein an equal luminance can be obtained using an optical modulation device of a smaller size such as a GLV device can be implemented, and also reduction in cost and scale of the apparatus can be anticipated.

While several embodiments of the present invention have been described, the configuration of the present invention is not limited to the embodiments described above, but the arrangement configuration of the optical system of the image display apparatus, the material configuration of the other parts of the optical modulation device other than the light illumination surface, the configuration of the first and second surface elements and, where the present invention is applied to an image display apparatus, the arrangement configuration of the optical parts of the image display apparatus can be altered or modified in various manners without departing from the spirit and scope of the present invention.

What is claimed is:

1. An optical modulation device, comprising:
first and second surface elements movable relative to each other to form different diffraction gratings to modulate light inputted thereto;
each of said first and second surface elements having a light illumination surface made of an AlCu alloy material;
said optical modulation device having an airtight sealed space in which surrounding gas for said first and second surface elements is encapsulated;
the surrounding gas containing hydrogen gas or helium gas or both of hydrogen gas and helium gas, said hydrogen gas or helium gas or both hydrogen gas and helium gas causing the surrounding gas to have a thermal conductivity sufficient to suppress a degradation of said first and second surface elements resulting from operation of the optical modulation device.

2. An optical modulation device according to claim 1, wherein said first and second surface elements are inclined at a predetermined angle with respect to a reference plane, and at least in one state, said first and second surface elements are juxtaposed in a substantially same plane whereas the distance between said first and second surface elements is equal to or greater than 0.1 μm but equal to or smaller than 0.4 μm.

3. An optical modulation device according to claim 1, wherein said surrounding gas contains 10% or more of said hydrogen gas or helium gas or both of hydrogen gas and helium gas.

4. An optical modulation device according to claim 1, wherein said surrounding gas contains between 10% and 30% hydrogen gas.

5. An optical modulation device according to claim 4, wherein said surrounding gas contains between 10% and 50% helium gas.

6. An optical modulation device according to claim 1, wherein said surrounding gas contains between 10% and 50% helium gas.

7. An optical modulation device according to claim 1, wherein said surrounding gas contains one or more gasses having a high effective viscosity coefficient as a primary component and said hydrogen gas or helium gas or both hydrogen gas and helium gas as a secondary component.

8. An image display apparatus, comprising:
an optical modulation device; and
a screen on which light modulated by said optical modulation device is projected to form an image;
said optical modulation device including first and second surface elements movable relative to each other to form different diffraction gratings to modulate light inputted thereto;
each of said first and second surface elements having a light illumination surface made of an AlCu alloy material;
said optical modulation device having an airtight sealed space in which surrounding gas for said first and second surface elements is encapsulated;
the surrounding gas containing hydrogen gas or helium gas or both of hydrogen gas and helium gas, said hydrogen gas or helium gas or both hydrogen gas and helium gas causing the surrounding gas to have a thermal conductivity sufficient to suppress a degradation of said first and second surface elements resulting from operation of said optical modulation device.

9. An image display apparatus according to claim 8, wherein said first and second surface elements are inclined at a predetermined angle with respect to a reference plane, and at least in one state, said first and second surface elements are juxtaposed in a substantially same plane whereas the distance between said first and second surface elements is equal to or greater than 0.1 μm but equal to or smaller than 0.4 μm.

10. An image display apparatus according to claim 9, wherein said optical modulation device is disposed at a position displaced from a beam waist position of the light condensed by a condenser lens, and an image at a beam waist position of one of diffraction lights diffracted by said optical modulation device is used to form an image.

11. An image display apparatus according to claim 8, wherein said optical modulation device is disposed at a position displaced from a beam waist position of the light condensed by a condenser lens, and an image at a beam waist position of one of diffraction lights diffracted by said optical modulation device is used to form an image.

12. An image display apparatus according to claim 8, wherein said surrounding gas contains 10% or more of said hydrogen gas or helium gas or both of hydrogen gas and helium gas.

13. An image display apparatus according to claim 8, wherein said surrounding gas contains between 10% and 30% hydrogen gas.

14. An image display apparatus according to claim 13, wherein said surrounding gas contains between 10% and 50% helium gas.

15. An image display apparatus according to claim 8, wherein said surrounding gas contains between 10% and 50% helium gas.

16. An image display apparatus according to claim 8, wherein said surrounding gas contains one or more gasses having a high effective viscosity coefficient as a primary component and said hydrogen gas or helium gas or both hydrogen gas and helium gas as a secondary component.

* * * * *